United States Patent
Huang

(10) Patent No.: US 11,651,516 B2
(45) Date of Patent: May 16, 2023

(54) MULTIPLE VIEW TRIANGULATION WITH IMPROVED ROBUSTNESS TO OBSERVATION ERRORS

(71) Applicant: SONY CORPORATION, Tokyo (JP)

(72) Inventor: Sangxia Huang, Malmö (SE)

(73) Assignee: Sony Group Corporation, Tokyo (JP)

(*) Notice: Subject to any disclaimer, the term of this patent is extended or adjusted under 35 U.S.C. 154(b) by 53 days.

(21) Appl. No.: 17/153,273

(22) Filed: Jan. 20, 2021

(65) Prior Publication Data

US 2021/0264637 A1    Aug. 26, 2021

(30) Foreign Application Priority Data

Feb. 20, 2020    (SE) .................................... 2050193-8

(51) Int. Cl.
| | |
|---|---|
| *G06T 7/73* | (2017.01) |
| *G06T 7/579* | (2017.01) |
| *G01C 21/16* | (2006.01) |
| *G06T 7/246* | (2017.01) |

(52) U.S. Cl.
CPC ............ *G06T 7/75* (2017.01); *G01C 21/1656* (2020.08); *G06T 7/246* (2017.01); *G06T 7/579* (2017.01); *G06T 2207/30244* (2013.01)

(58) Field of Classification Search
None
See application file for complete search history.

(56) References Cited

U.S. PATENT DOCUMENTS

| | | |
|---|---|---|
| 6,009,189 A | 12/1999 | Schaack |
| 9,031,782 B1 | 5/2015 | Lemay |
| 9,466,143 B1 | 10/2016 | Walvoord |

(Continued)

FOREIGN PATENT DOCUMENTS

| | | |
|---|---|---|
| WO | 2007031248 A2 | 3/2007 |
| WO | 2017052983 A1 | 3/2017 |

(Continued)

OTHER PUBLICATIONS

Multiple View Reconstruction of Calibrated Images using Singular Value Decomposition. Chaudhury et al. (Year: 2010).*

(Continued)

*Primary Examiner* — Delomia L Gilliard
(74) *Attorney, Agent, or Firm* — Tucker Ellis LLP

(57) ABSTRACT

Triangulation is applied, by a method and a device, to determine a scene point location in a global coordinate system, GCS, based on location coordinates for observed image points in plural views of a scene, and global-local transformation matrices for the views. The local coordinates are given in local coordinate systems, LCSs, arranged to define distance coordinate axes that are perpendicular to image planes of the views. The scene point location is determined by minimizing a plurality of differences between first and second estimates of the scene point location in the LCSs, the first estimates being given by linear scaling of the location coordinates, and the second estimate being given by operating the transformation matrices on the scene point location. An improved robustness to observation errors is achieved by defining the plurality of differences to penalize differences that includes the linear scaling as applied along the distance coordinate axes.

19 Claims, 5 Drawing Sheets

(56) References Cited

U.S. PATENT DOCUMENTS

| | | | |
|---|---|---|---|
| 10,395,117 B1 | 8/2019 | Zhang | |
| 10,489,912 B1 | 11/2019 | Brailovskiy | |
| 2005/0248539 A1 | 11/2005 | Morrison | |
| 2010/0017178 A1* | 1/2010 | Tsuk | G06T 7/73 |
| | | | 701/300 |
| 2014/0043329 A1 | 2/2014 | Wang | |
| 2016/0203390 A1* | 7/2016 | Nogayama | G06T 7/579 |
| | | | 382/224 |
| 2017/0091945 A1 | 3/2017 | Vetterli | |
| 2017/0178390 A1* | 6/2017 | Ye | G06T 7/55 |

FOREIGN PATENT DOCUMENTS

| | | |
|---|---|---|
| WO | 2018023333 A1 | 2/2018 |
| WO | 2019032307 A1 | 2/2019 |

OTHER PUBLICATIONS

Baseline Desensitizing in Translation Averaging. Zhuang et al. (Year: 2018).*

Local Coordinates Alignment With Global Preservation for Dimensionality Reduction. Chen et al. (Year: 2013).*

Swedish Office Action and Search Report from corresponding Swedish Application No. 2050193-8, dated Nov. 9, 2020, 7 pages.

Alfarrarjeh, Abdullah et al., "A Data-Centric Approach for Image Scene Localization", 2018 IEEE International Conference on Big Data (Big Data); Dec. 10, 2018, 10 pages.

Vardhan, A. Harsha et al., "Unsupervised Approach for Object Matching using Speeded Up Robust Features", 2015 IEEE Applied Imagery Pattern Recognition Workshop (AIPR), Oct. 13, 2015, 8 pages.

Liu, Shiguang, "Shape-Optimizing and Illumination-Smoothing Image Stitching", IEEE Transactions on Multimedia, vol. 21, No. 3; Mar. 2019, 14 pages.

Nefti-Meziani, Samia et al., "3D Perception from Binocular Vision for a Low Cost Humanoid Robot NAO", Robotics and Autonomous Systems; dated 2015, pp. 129-139.

Computer Vision Lecture 3, "Lecture 3: Camera Calibration, DLT, SVD", dated Jan. 28, 2013, 7 pages.

Hartley, Richard I. et al., "Triangulation", Computer Vision and Image Understanding, vol. 68, No. 2, Nov. 1997, pp. 146-157.

* cited by examiner

MULTIPLE VIEW TRIANGULATION WITH IMPROVED ROBUSTNESS TO OBSERVATION ERRORS

RELATED APPLICATION DATA

This application claims the benefit of Swedish Patent Application No. 2050193-8, filed Feb. 20, 2020, the disclosure of which is incorporated herein by reference in its entirety.

TECHNICAL FIELD

The present disclosure relates generally to image-based positioning and, in particular, to multiple view triangulation, in which the location of one or more scene points is determined based on image points representing the scene point(s) in a plurality of views.

BACKGROUND ART

Image-based positioning systems that operate on image data from digital cameras are used in many commercial applications and are capable of achieving high accuracy at reasonable cost. A major technical challenge of such systems is to reliably determine, and possibly track, the location of objects of interest under difficult situations such as crowding and occlusion.

During operation, image-based positioning systems may perform a detection step for detecting objects and/or keypoints in individual video streams, an association step for associating the detected objects/keypoints in different video streams with each other, and a positioning step for calculating 3D positions in a global coordinate system based on the locations of associated keypoints ("image points") in the different video streams, and possibly based on temporal information. In one implementation, the positioning step involves a triangulation of image point locations in a plurality of overlapping views, for example taken by an arrangement of spaced-apart digital cameras. Such multiple view triangulation often assumes that the arrangement of cameras has been calibrated so that the positions and orientations of the cameras are known.

The prior art comprises so-called linear triangulation methods, in which a set of linear equations is determined based on calibration data for the cameras and image point locations in the overlapping views. A corresponding 3D position in a global coordinate system is determined by finding a solution to the set of linear equations. Examples of linear triangulation methods are, for example, found in the article "Triangulation", by Hartley and Sturm, published in "Computer vision and image understanding", Vol. 68, No. 2, pp. 146-157, 1997. One well-known implementation of linear triangulation methods is Direct Linear Transformation (DLT) which, for example, is included in the widely used OpenCV library of programming functions.

Linear triangulation methods have the advantage of being computationally efficient, simple to implement, and easily adapted to different numbers of overlapping views. However, like many other triangulation methods, linear triangulation methods are sensitive to inaccuracy in the image point locations, and the performance of the triangulation tends to degrade significantly with increasing inaccuracy. Such inaccuracy, or "observation error", may be caused by noise or other disturbances in the image data.

Position determination by triangulation is not limited to the use of image data from digital cameras but is generally applicable to any image data irrespective of its origin. Thus, the impact of observation errors is a concern whenever triangulation methods are applied to calculate a 3D position based on a plurality of overlapping 2D observations of a scene.

BRIEF SUMMARY

It is an objective to at least partly overcome one or more limitations of the prior art.

Another objective is to provide a triangulation technique with improved robustness to errors in the observed locations of image points in a plurality of overlapping views of a scene.

Yet another objective is to provide a triangulation technique that is computationally efficient and easily adapted to different numbers of overlapping views. One or more of these objectives, as well as further objectives that may appear from the description below, are at least partly achieved by a method and a device for determining a location of a scene point in a global coordinate system, as well as a monitoring system, according to the independent claims, embodiments thereof being defined by the dependent claims.

Still other objectives, as well as features, aspects and technical effects will appear from the following detailed description, from the attached claims as well as from the drawings.

BRIEF DESCRIPTION OF DRAWINGS

Embodiments will now be described in more detail with reference to the accompanying schematic drawings.

DETAILED DESCRIPTION OF EXAMPLE EMBODIMENTS

Figure 1:
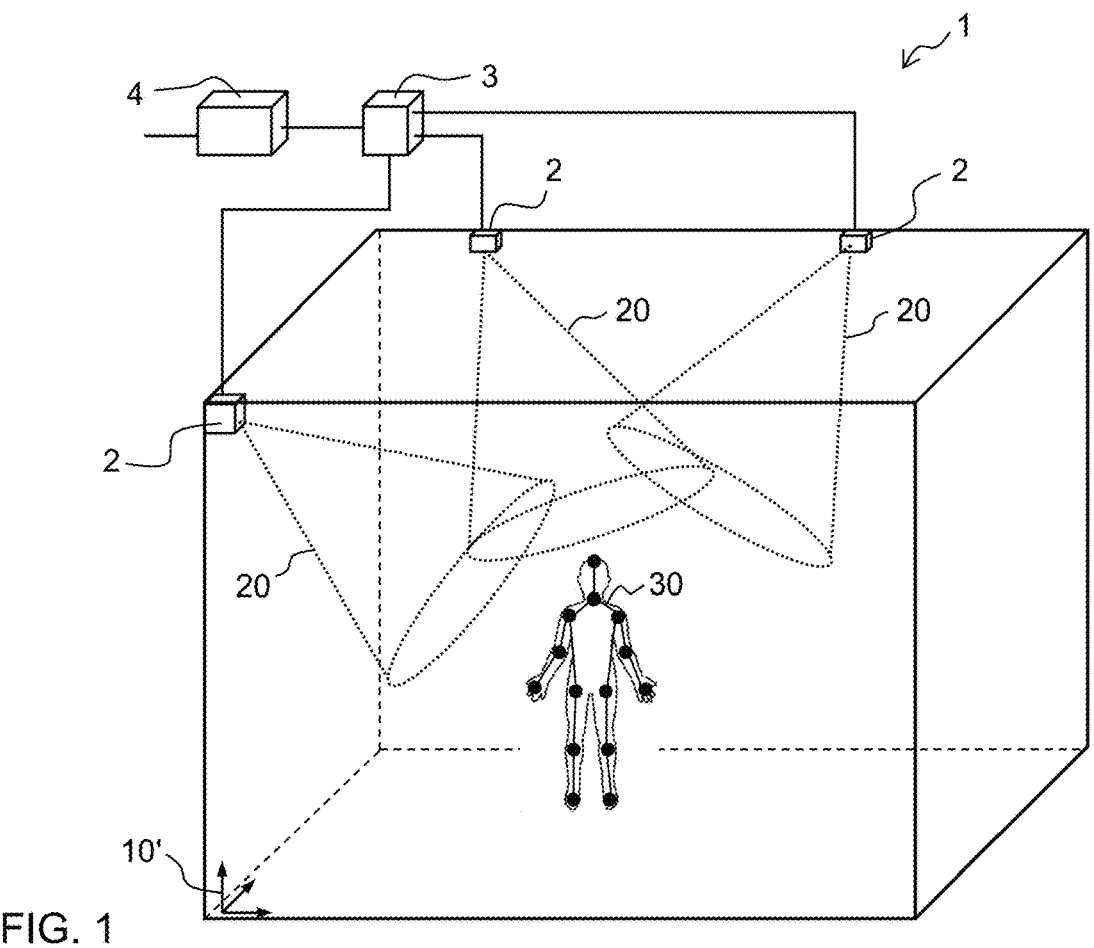
FIG. 1 is a perspective view of an example installation of a monitoring system configured to perform image-based positioning.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. The term "compute", and derivatives thereof, is used in its conventional meaning and may be seen to involve performing a calculation involving one or more mathematical operations to produce a result, for example by use of a computer.

As used herein, the terms "multiple", "plural" and "plurality" are intended to imply provision of two or more items, whereas the term a "set" of items is intended to imply a provision of one or more items. The term "and/or" includes any and all combinations of one or more of the associated listed items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like reference signs refer to like elements throughout. Vectors and matrices are designated by bold reference signs.

Before describing embodiments in more detail, a few definitions will be given.

As used herein, "scene" denotes a three-dimensional (3D) space that is collectively monitored by two or more imaging devices. The imaging devices have at least partly overlapping fields of views.

As used herein, "imaging device" is a device configured to generate images of a scene by detection of electromagnetic waves and/or mechanical waves that are generated and/or reflected by the scene and objects therein. The imaging device may be responsive to electromagnetic waves in any wavelength range, including but not limited to ultraviolet, visible or infrared radiation, or any part or combination thereof. The imaging device may be configured to produce still images or a digital video stream, i.e. a coherent time-sequence of images. The respective image is a two-dimensional (2D) representation of the scene, or part thereof, as seen by the imaging device.

As used herein, "view" refers to the part of the scene that is included within the field of view of an imaging device. The view may be embodied as an image, for example a digital image.

As used herein, "scene point" is any point in a scene that is included and detectable in images generated by two or more imaging devices.

As used hereon, "image point" is a representation of the scene point in an image. The image point may also be denoted "feature point" or "interest point". In the following, the image point is denoted keypoint. The term keypoint is commonly used in in the field of computer vision, where it refers to a spatial location or point in an image that defines what is interesting or what stand out in the image and may be defined to be invariant to image rotation, shrinkage, translation, distortion, etc. More generally, a keypoint is a reference point on an object to be detected in the image, with the reference point having a predefined placement on the object. Keypoints may be defined for a specific type of object, for example a human body, a part of the human body, or an inanimate object with a known structure or configuration. In the example of a human body, keypoints may identify one or more joints and/or extremities. Keypoints may be detected by use of existing and well-known feature detection algorithm(s).

As used herein, "coordinate system" refers to a reference system for uniquely defining positions in a space in relation to an origin. The coordinate system may be defined in Euclidean space or in projective space. The respective position is represented by a set of coordinates, which represent a respective dimension of the space. In projective space, the coordinates are also known as "homogeneous coordinates". In Euclidean space, a two-dimensional (2D) position may be represented by two coordinates and a three-dimensional (3D) position may be represented by three coordinates.

FIG. 1 shows an example arrangement of a monitoring system 1 in accordance with an embodiment. The system 1 is arranged to monitor a scene in a room. The system 1 comprises a plurality of imaging devices 2, for example digital cameras, which are oriented with their respective field of view 20 towards the scene. The scene is associated with a fixed 3D coordinate system 10' ("global coordinate system"). The imaging devices 2 may be fixed or moveable, and their relative positions and orientations are known for each image taken. The imaging devices 2 may be synchronized to capture a respective image at approximately the same time, or at least with a maximum time difference which depends on the expected maximum speed of movement of the objects 10. In one example, a maximum time difference of 0.1-0.5 seconds may provide sufficient accuracy for normal human motion.

The images captured by the imaging devices 2 are received by a detection device 3, which is configured to determine one or more keypoints of the object in the respective image. In the illustrated example, the object is an individual 30 and keypoints are shown as black dots. The detection device 3 may implement any conventional object detection technique for identifying objects of a generic or specific type in the respective image and may implement any conventional feature detection technique for identifying one or more keypoints of the respective object. The detection device may also pre-process the incoming images, for example for noise reduction, contrast enhancement, etc. In an alternative configuration, the monitoring system 1 comprises a plurality of detection devices 3, for example one for each imaging device 2, where the detection devices 3 may be co-located or integrated with the imaging devices 2. The detection device 3 produces detection data, which identifies the one or more keypoints of one or more objects detected in the respective image, and the location of the respective keypoint.

The system 1 further comprises a positioning device 4, which is configured to operate on the detection data to compute, and possibly track over time, one or more 3D positions in the global coordinate system 10' for one or more objects in the scene 5. The positioning device 4 computes the 3D position(s) by triangulation, for example based on methods described hereinbelow.

Figure 2:
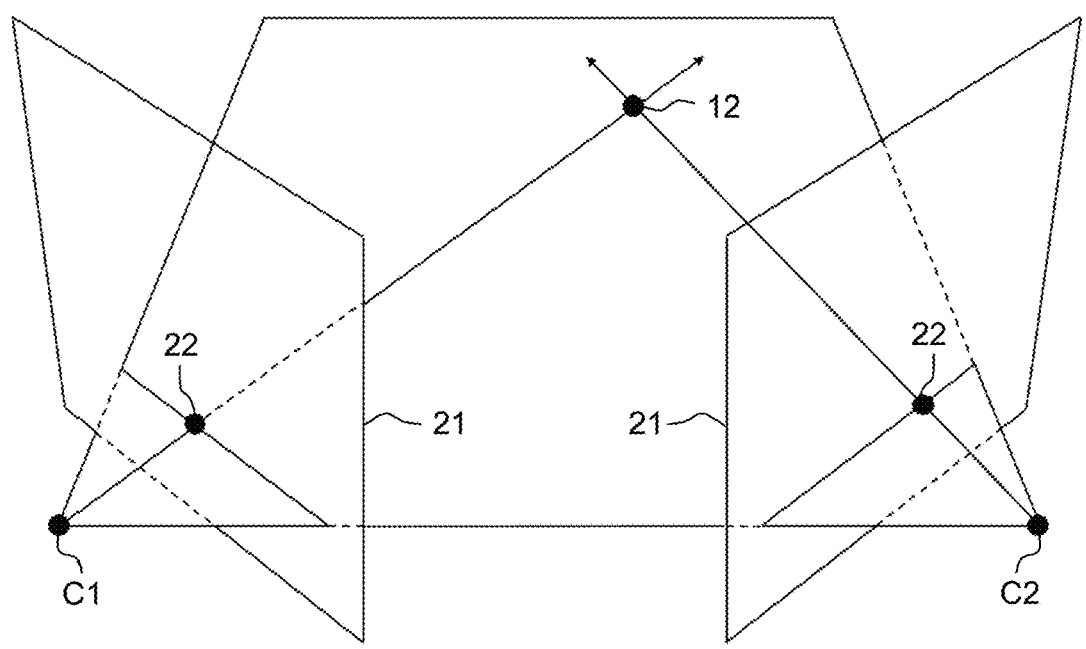
FIG. 2 is a graphical representation of triangulation, in the absence of errors in an image-based geometry, to determine a scene point location from corresponding image points in two images.

FIG. 2 shows an idealized triangulation of a keypoint 22 found in two 2D images in the absence of errors in the image geometry (for example, each 2D image may be represented by a 2D array of pixel values). A first camera position has a camera center C1 that produces a first image in a first image plane 21 having a keypoint 22. A second camera position has a camera center C2 that produces a second image in a second image plane 21 having a keypoint 22 that corresponds to the same real-world feature 12 ("scene point") as keypoint 22. Rays extending from the camera centers C1, C2 through the respective keypoints 22 on corresponding epipolar lines intersect at a 3D position in the epipolar plane. In the absence of observation errors, the 3D position matches the location of the scene point 12 exactly.

One challenge is that the detection of keypoints 22 may be affected noise and other artifacts, resulting in observation errors in the locations of the keypoint 22 within the image plane 21. In practice, an observation error may be expressed as a pixel error, which represents the distance between the observed location of the keypoint 22 in the image plane 21 and the projection of the ground truth (i.e. the actual location of the scene point 12) onto the image plane 21. It is not uncommon that the pixel error of state-of-the-art keypoint detectors is quite large, in particular when used for detecting keypoints on individuals. For example, for an imaging device with sensor size 1920×1080 pixels, the pixel error may be 30 pixels or more.

Existing triangulation methods generally belong to a few different classes. One class contains "optimal" methods, which use sophisticated algebraic techniques to find a 3D position that minimizes reprojection error. Such methods are known for triangulation based on two or three views, but generalization to further views is difficult. Compared to other classes, optimal methods are more complicated to implement. Another class contains the linear methods described in the Background section hereinabove. Linear methods are fast and may be simply adapted to any number of views. Generally, linear methods suffer from being sensitive to observation errors. Yet another class contains branch-and-bound search methods, which are applicable to any number of views but are slower and more complicated than linear methods. Generally, the performance of existing triangulation methods tends to degrade quickly when the standard deviation of the pixel error is more than about 10 pixels.

Embodiments described herein relate to providing a triangulation method that has an improved robustness to detection errors ("observation errors") affecting the observed location of keypoints in the images. Embodiments may be seen as an improvement of the above-mentioned class of linear methods, while retaining its properties of being computationally efficient and easily adapted to different numbers of overlapping views.

In linear methods, the respective imaging device is represented by so-called camera equations, which may be given in matrix notation by: q·s=P·S, where q is a scaling factor, s is a vector of coordinates for the keypoint, P is a transformation matrix, also known as "camera matrix", and S is a vector of coordinates for the scene point. To simplify the computations, the vectors s, S may be given in homogeneous coordinates, as is well-known in the art.

Figure 3:
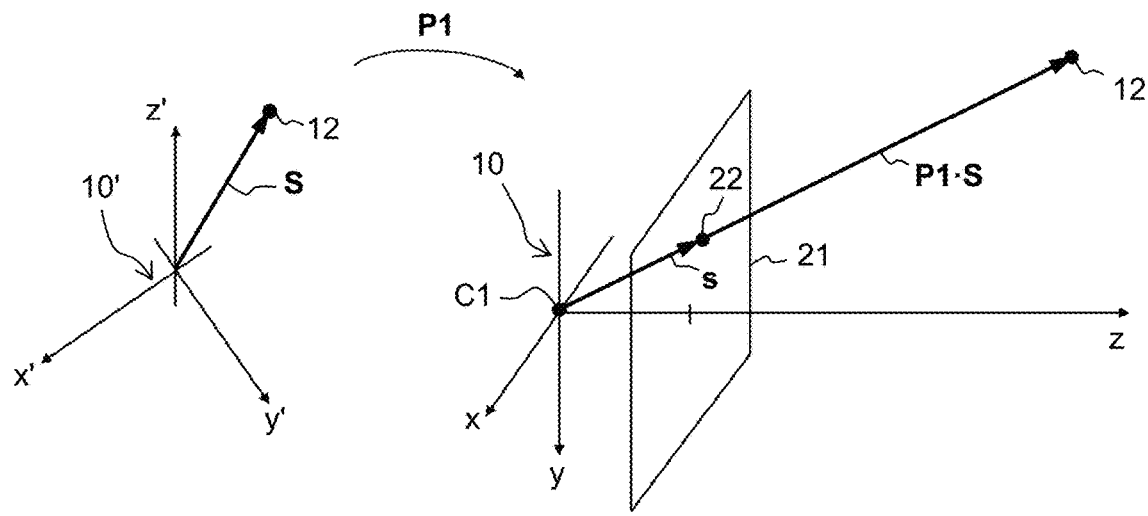
FIG. 3 is a graphical representation of a mapping of a local coordinate system of an imaging device to a global coordinate system.

FIG. 3 is a schematic illustration of the operation of a transformation matrix P1, which may correspond to the above-mentioned camera matrix P. In the illustrated example, the transformation matrix P1 defines a transformation operation between a first coordinate system 10' defining coordinates (x', y', z') and a second coordinate system 10 defining coordinates (x,y,z). In the following examples, the first coordinate system 10' is a global coordinate system (GCS) which is common to all of the imaging devices 2 facing the scene (cf. 10' in FIG. 1), and the second coordinate system 10 is a local coordinate system (LCS) of the respective imaging device 2. The LCS 10 is arranged with two of its coordinate axes (x, y) parallel to the image plane 21 and the third coordinate axis (z) extending perpendicular to the image plane 21, for example along the optical axis of the imaging device 2. Thereby, P1 encodes the orientation and position of the imaging device 2 with respect to the GCS 10', which may have its origin in any position in relation to the scene, for example as shown in FIG. 1. It is conceiv-able that the GCS 10' is located at the same origin as the LCS 10 of one of the imaging devices 2. In the illustrated example, the LCS 10 has its origin in the camera center C1 (cf. FIG. 2). The transformation matrix P1 transforms a global location vector S, with coordinates of a scene point 12 in the GCS 10', to a transformed location vector in the LCS 10 given by the matrix product P1·S. FIG. 3 also illustrates a local location vectors with coordinates of a keypoint 22 in the LCS 10. It may be noted that the above-mentioned camera equations designate that a scaling of the local location vector s by a scaling factor q1 results in the transformed location vector: q1·s=P1·S.

While the example in FIG. 3 presumes that the location of the keypoint 22 is given in the LCS 10, it is often given in a third coordinate system (not shown) in the image plane 21, for example given by pixel location in two dimensions. It is straight-forward to modify the transformation matrix P1 to define the transformation operation from the third coordinate system to the first coordinate system 10 by use of so-called inner or intrinsic parameters of the imaging device, such as focal length, principal point etc.

Since the scene point 12 is represented by a respective keypoint 22 in two or more views, the following equation system may be defined:

$$\begin{cases} q1 \cdot s1 = P1 \cdot S \\ q2 \cdot s2 = P2 \cdot S \\ \vdots \\ qn \cdot sn = Pn \cdot S \end{cases}$$

where index n denotes the number of views. By rearrangement, this equation system may be represented as M·v=0 with $$M = \begin{bmatrix} P1 & -s1 & 0 & \cdots & \cdots & 0 \\ P2 & 0 & -s2 & \cdots & \cdots & 0 \\ \vdots & \vdots & \vdots & \cdots & \cdots & 0 \\ \vdots & \vdots & \vdots & \cdots & \cdots & 0 \\ Pn & 0 & 0 & \cdots & \cdots & -sn \end{bmatrix}, \text{ and}$$

$$v = \begin{bmatrix} S \\ q1 \\ \vdots \\ qn \end{bmatrix}.$$

The solution vector v is unknown and contains the global location vector S to be determined, whereas the matrix M is known since the transformation matrices P1, P2, ..., Pn are known and the local location vectors s1, s2, ..., sn are given by the observed locations of the keypoints in the different views. Generally, the equation system M·v=0 will not have an exact solution as a result of observation errors. Instead, the equation system may be regarded as an error function to be minimized, e=M·v. This is commonly denoted "homogeneous least squares problem", and there are a multitude of ways of finding the solution vector v that (approximately) minimizes the error function. In one example, the solution vector v is derived by computing and applying the pseudo-inverse of M. In another example, M is processed by single value decomposition (SVD) and the solution vector v is given by the eigenvector that corresponds to the smallest singular value.

Embodiments are based on the insight that while the introduction of the scaling factors q1, ..., qn makes the triangulation task linear, it also introduces a possibility of inconsistency in the solution. Specifically, the scaling factors q1, ..., qn may take values that are geometrically inconsistent with the original coordinates in Euclidean space. Surprisingly, it has been found that this inconsistency is a major source of the steep increase in triangulation error with increasing observation error.

Figure 4:
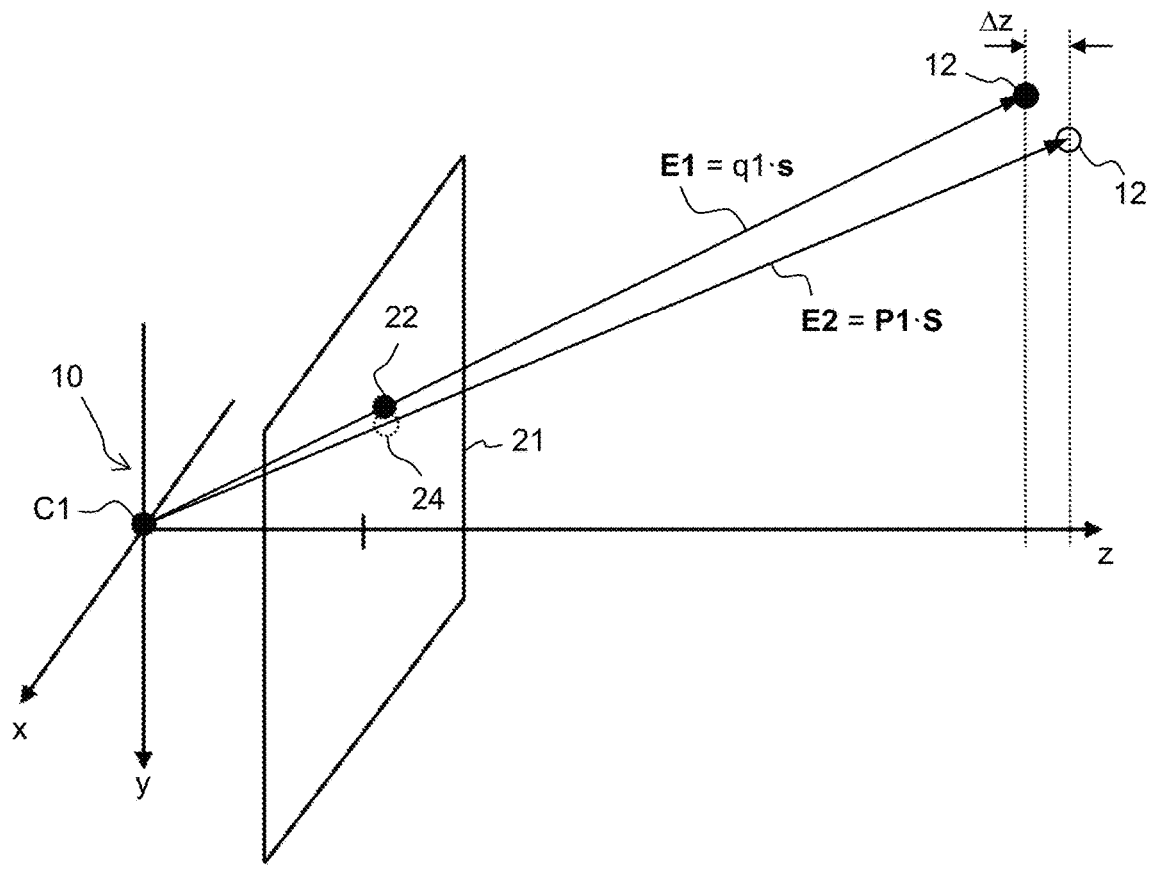
FIG. 4 is a graphical representation of the impact of observation error on triangulation.

FIG. 4 illustrates an observed keypoint 22 in one view among two or more views. A first vector E1 is formed by scaling the local location vector s by the unknown scaling factor q1, the first vector E1 representing a first possible location of the scene point 12 in the LCS 10. A second vector E2 is formed by operating the transformation matrix P1 on the unknown location S of the scene point 12 in the GCS 10' (FIG. 3), the second vector E2 representing a second possible location of the scene point 12 in the LCS 10. Finding a minimum of the above-mentioned error function e=M·v corresponds to finding the best compromise between E1 and E2 for all views, i.e. minimizing the aggregated differences between E1 and E2 for all views. If E2 in FIG. 4 is assumed to represent the true location of the scene point 12, corresponding to an error-free keypoint 24 in the image plane 21, it is understood that the minimization of the error function not only results in adjustments in pixel units (x, y coordinates) but also in adjustments in distance units (z coordinate), represented as Δz. Worded differently, one of the values in e represents the resulting error along the z axis ("distance axis"), and two of the values in e represent the resulting error along the x axis and the y axis, respectively. Surprisingly, it has now been found that by forcing the error along the z axis to a small value, the triangulation error is significantly reduced. In accordance with some embodiments, this is achieved by penalizing adjustments along the z axis when minimizing the error function e. This may be understood as effectively making the error for each view proportional to the reprojection error for that view, and thus minimizing the error function corresponds to minimizing the reprojection errors of all views.

Figure 5A:
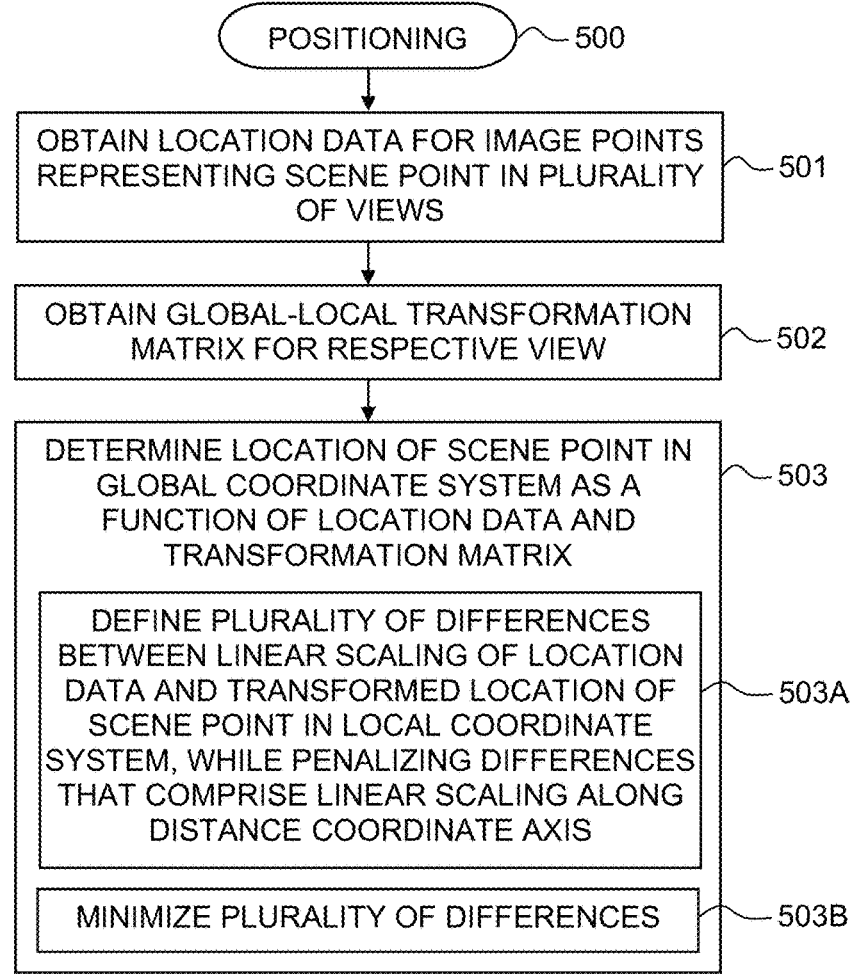
FIGS. 5A-5B are flow charts of methods for determination of scene point location based on image points, potentially afflicted by observation errors, in accordance with embodiments.

FIG. 5A is a flow chart of a triangulation method 500 according to an embodiment. Step 501 obtains location data for keypoints ("image points") representing a scene point in a plurality of views. Step 501 may obtain the location data from another process, for example executed by the pre-processing device 3 in FIG. 1. Alternatively, step 501 may detect keypoints in the different views, associate the keypoints between the different views, and determine the location data for the associated keypoints. The location data may, for example, be given as pixel coordinates in the image plane (21 in FIGS. 2-4). Step 502 obtains a global-local transformation matrix for the respective view. The global-local transformation matrix may correspond to the respective transformation matrix P1, P2, ..., Pn as described above. Step 502 may, for example, retrieve the transformation matrix from a memory. Step 503 determines the location of the scene point 12 in the GCS 10' as a function of the location data and the transformation matrices. Step 503 comprises sub-steps 503A and 503B. Sub-step 503A defines a plurality of differences between the first vectors E1 which represent a linear scaling of the location data for the respective view, and the second vectors E2 which represent a transformed location of the scene point 12 in the LCS 10 of the respective view, while penalizing a specific subset of the differences, namely differences that comprise the linear scaling of the location data in distance units, i.e. along the distance axis (z axis) of the LCS 10. Sub-step 503B minimizes the plurality of differences and determines, based thereon, the location of the scene point 12 in the GCS 10'.

In some embodiments, the minimization in sub-step 503B is performed as a function of the location of the scene point 12 in the GCS 10' (cf. S above) and the scaling factors that are applied in the linear scaling (cf. q1, ..., qn above).

The skilled person realizes that the minimization of the plurality of differences in step 503 may be performed according to any established minimization technique. If there are n views, the differences may be designated as $(d_{1x}, d_{1y}, d_{1z}, d_{2x}, d_{2y}, d_{2z}, \ldots, d_{nx}, d_{ny}, d_{nz})$ in the local coordinate system 10 (cf. FIG. 3), and step 503 collectively minimizes the differences while applying the penalization. In the matrix notation above, the differences may be given by M·v. The minimization of step 503 may be made subject to one or more constraints. An example of such a constraint is that $\|v\|_2=1$, which means that the solution vector v has a Euclidean length of 1. In some embodiments, step 503 may minimize a loss function that operates on the plurality of differences. One example of such a loss function is a norm function. In one example, step 503 comprises minimizing the 2-norm of the plurality of differences. Such a minimization of the 2-norm may, for example, be solved by SVD as mentioned above. In another example, step 503 comprises minimizing the 1-norm of the plurality of differences (the sum of the absolute values of the differences). The use of the 1-norm may be beneficial when the number of views (n) is large and may result in a minimization that is more robust to noise. In one non-limiting implementation, a solution vector v that minimizes such a loss function may be calculated by first finding an intermediate solution vector by use of SVD, and then performing a few steps of projected gradient descent, so as to update the intermediate solution vector with gradient with respect to the loss function and rescale the updated solution vector to satisfy the constraint $\|v\|_2=1$.

The skilled person also understands that "penalizing" a specific subset of the differences in the context of sub-step 503A infers that the minimization in sub-step 503B will result in smaller values of the differences in the specific subset with penalizing compared to without penalizing. Thus, the penalizing is implemented to force the specific subset of differences to smaller values. In the above notation of differences, the penalization may be applied to the subset given by $(d_{1z}, d_{2z}, \ldots, d_{nz})$. The skilled person understands that differences may be penalized in many different ways to attain the desired effect.

In some embodiments, step 503 comprises introducing a selected penalization factor into the plurality of differences so as to penalize the specific subset of differences. If the penalization factor is designated by k, an example penalized 2-norm to be minimized by step 503 may be represented by $$\sqrt[2]{d_{1x}^2 + d_{1y}^2 + \lambda \cdot d_{1z}^2 + d_{2x}^2 + d_{2y}^2 + \lambda \cdot d_{2z}^2 + \ldots + d_{nx}^2 + d_{ny}^2 + \lambda \cdot d_{nz}^2},$$

which may be compared to the regular (non-penalized) 2-norm:

$$\sqrt[2]{d_{1x}^2 + d_{1y}^2 + d_{1z}^2 + d_{2x}^2 + d_{2y}^2 + d_{2z}^2 + \ldots + d_{nx}^2 + d_{ny}^2 + d_{nz}^2}.$$

Based on the disclosure herein, the skilled person understands how to apply a penalization factor to any type of loss function to be minimized by step 503.

Figure 5B:
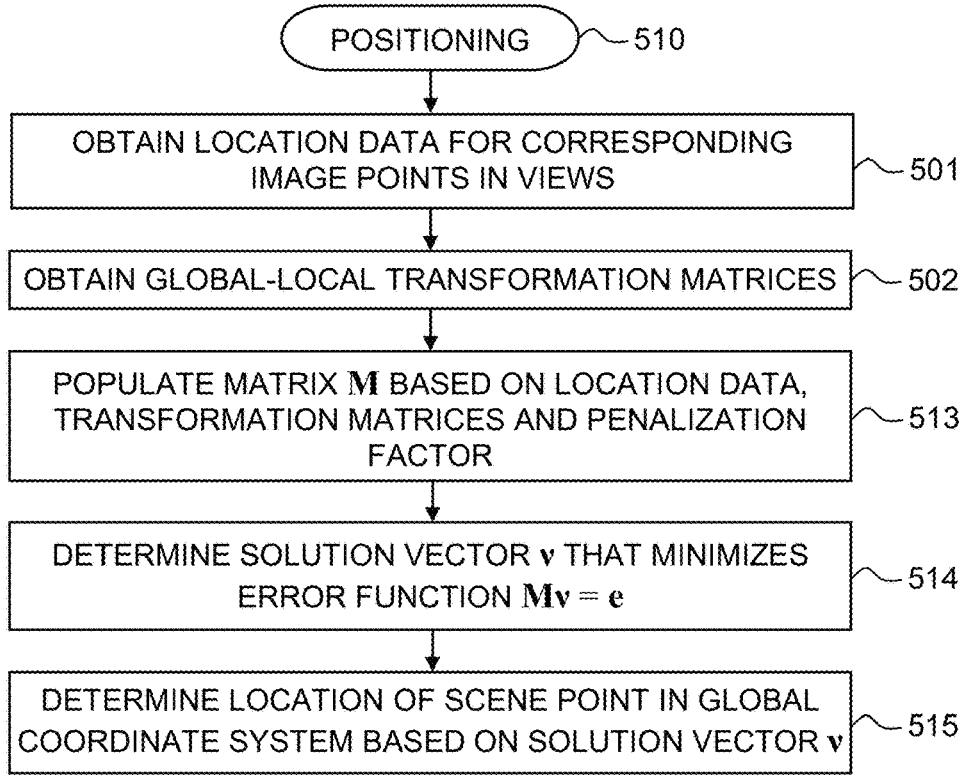

FIG. 5B is a flow chart of a triangulation method 510, which is an example implementation of the method 500 and involves the penalization factor. The method 510 comprises steps 501 and 502 which may be the same as in FIG. 5A. Thus, step 501 obtains location data for corresponding keypoints between views, i.e. keypoints that represent the same scene points. The location data thereby defines local location vectors s1, ..., sn. Step 501 may also involve a normalization of the local location vectors s1, ..., sn, as is known in the art. Step 502 obtains the global-local transformation matrix P1, Pn of the respective view. Steps 513-515 correspond to step 503 in FIG. 5A. Step 513 populates the matrix M of the error function e=M·v based on the location data, the transformation matrices, and the penalization factor. The error function corresponds the above-mentioned plurality of differences as defined by step 503A. The solution vector v represents both the location of the scene point 12 in the GCS 10' and the scaling factors. In populating the matrix M, step 513 applies the penalization factor to selected matrix elements of the matrix M, where the selected matrix elements define differences that comprise the linear scaling as applied along the distance axis (z axis) of the LCS 10. Step 514 determines, by any available technique, the solution vector v that yields a minimum or an approximate minimum of the error function e=M·v. Step 515 determines the location of the scene point 12 in the GCS 10' based on the solution vector v. For example, step 515 may extract the global location vector S from the solution vector v and, if given in homogenous coordinates, convert it into a position in Euclidean space. For example, to derive a 3D position, first, second and third values in the vector S may be divided by a fourth value the vector S.

In some embodiments, the matrix M is given by:

$$M = \begin{bmatrix} P1' & -s1 & 0 & \ldots & \ldots & 0 \\ P2' & 0 & -s2 & \ldots & \ldots & 0 \\ \vdots & \vdots & \vdots & \ldots & \ldots & 0 \\ \vdots & \vdots & \vdots & \ldots & \ldots & 0 \\ Pn' & 0 & 0 & \ldots & \ldots & -sn \end{bmatrix}$$

Here, P1', ..., Pn' designate "penalized transformation matrices" for the different views, and s1, ..., sn are local location vectors comprising the location coordinates of the respective keypoint in the LCS 10 of the respective view. Index n designates the number of views. The respective penalized transformation matrix P1', ..., Pn' is obtained by scaling the matrix elements in one row of the corresponding transformation matrix P1, ..., Pn by the penalization factor. Also, a local coordinate corresponding to said one row in each local location vector s1, ..., sn is scaled by the penalization factor. The magnitude of the penalization factor may be predefined, and a suitable magnitude may be determined by testing. In some embodiments, the penalization factor is at least $10^2$, $10^3$, $10^4$, $10^5$, $10^6$, $10^7$, $10^8$, $10^9$ or $10^{10}$.

In some embodiments, the respective penalized transformation matrix P1', ..., Pn' is a 3×4 matrix, and the local location vector s1, ..., sn is a 3×1 vector.

In some embodiments, the penalized transformation matrix is given by:

$$Pi' = \begin{bmatrix} Pi(1,1) & Pi(1,2) & Pi(1,3) & Pi(1,4) \\ Pi(2,1) & Pi(2,2) & Pi(2,3) & Pi(2,4) \\ \lambda \cdot Pi(3,1) & \lambda \cdot Pi(3,2) & \lambda \cdot Pi(3,3) & \lambda \cdot Pi(3,4) \end{bmatrix},$$

where index i designates the different views, Pi(k, l) designates the matrix elements of the transformation matrix Pi, and $\lambda$ is the penalization factor. Thus, the matrix elements of one row of Pi are scaled by the penalization factor.

In some embodiments, the local location vector is given by:

$$si = \begin{bmatrix} o_{ix} \\ o_{iy} \\ \lambda \end{bmatrix},$$

where index i designates the different views, and $o_{ix}$, $o_{iy}$ are the observed local coordinates of the keypoint 22 within the image plane 21 (cf. FIGS. 2-4). Thus, the local coordinate that corresponds to the penalized row of P1 is scaled by the penalization factor.

In some embodiments, the solution vector is given by:

$$v = \begin{bmatrix} S \\ q1 \\ \vdots \\ qn \end{bmatrix},$$

where S is the global location vector, and q1, ..., qn are the scaling factors, and index n designates the number of views.

In some embodiments, the location vector S is a 4×1 vector comprising homogeneous coordinates.

Figure 6A:
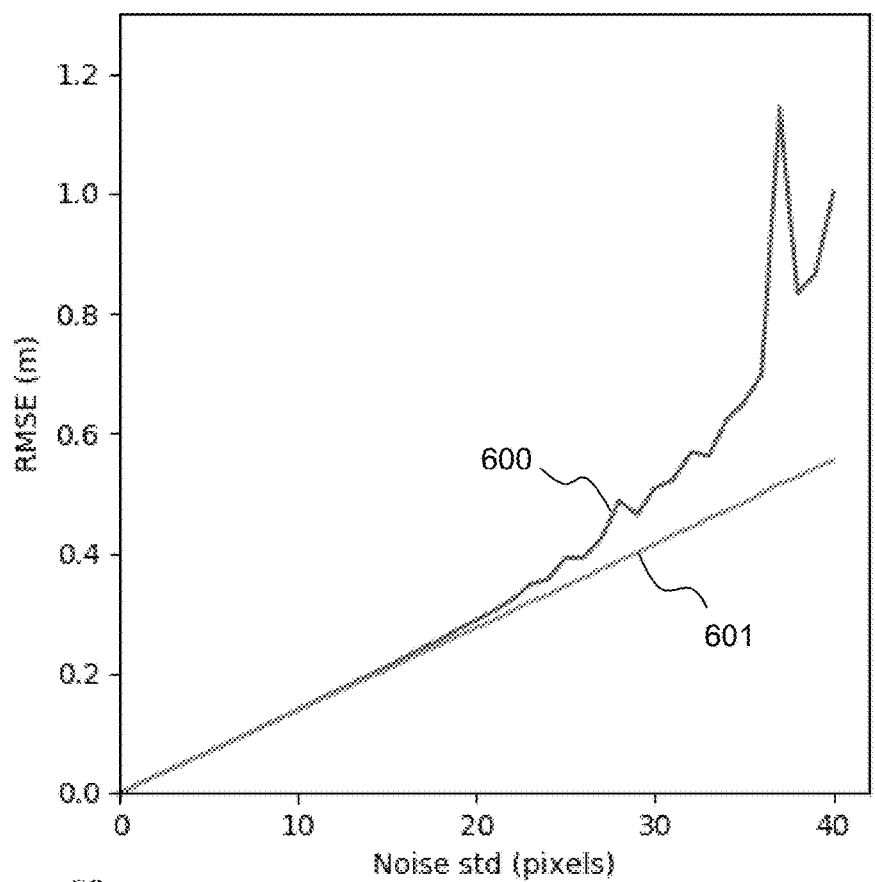
FIGS. 6A-6B are graphs comparing the performances of a conventional triangulation method and a triangulation method in accordance with an embodiment.
Figure 6B:
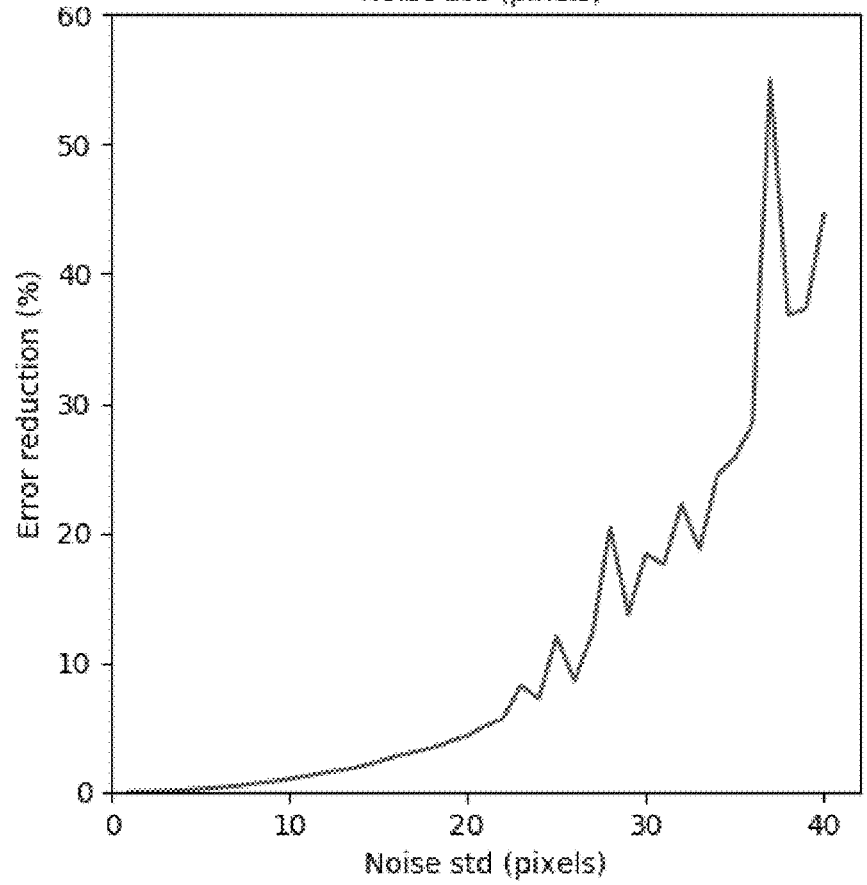

The performance of the method 510 has been evaluated for an ensemble of keypoint locations and corresponding scene points. The ensemble was generated for an arrangement of two imaging devices 150 degrees apart in the (x', y') plane of the GCS 10' (cf. FIG. 1), facing the scene and at a distance of 10 m from the center of the scene. The respective imaging device was given a resolution of 1920×1080 pixels and a focal length of 1300 pixel units. A transformation matrix for the respective imaging device was determined based on this data. The scene points were generated randomly within a cubic box located at the center of the scene and having a side length of 2 meter. The keypoints were produced by generating projections of the scene points onto the two views, by use of the respective transformation matrix, and by perturbing the projections by a selected amount of Gaussian noise. The method 510 was operated on the ensemble of keypoint locations, by use of the transformation matrices and a penalization factor $\lambda=10^9$, and the root mean squared error (RMSE) was calculated between the computed 3D positions and the original scene points. To benchmark the method 510, the conventional DLT method available in the OpenCV library was run on the ensemble of keypoint locations, and the RMSE was calculated between the resulting 3D positions and the original scene points. The graph of FIG. 6A shows RMSE 600 for the conventional DLT method and RMSE 601 for the method 510, as function of the standard deviation of added noise. The graph in FIG. 6B illustrates the error reduction in percent for the method 510 compared to the conventional DLT method. FIGS. 6A-6B clearly illustrate that the robustness to noise is significantly improved in the method 510.

Figure 7:
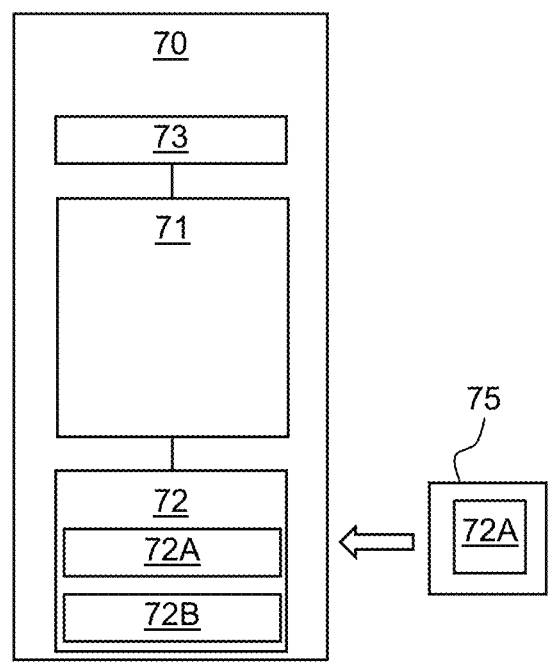
FIG. 7 is a block diagram of a machine that may implement any one of the methods in FIGS. 5A-5B.

The structures and methods disclosed herein may be implemented by hardware or a combination of software and hardware. In some embodiments, such hardware comprises one or more software-controlled computer resources. FIG. 7 schematically depicts such a computer resource 70, which comprises a processing system 71, computer memory 72, and a communication interface 73 for input and/or output of data. The communication interface 73 may be configured for wired and/or wireless communication, for example with the pre-processing device 3. The processing system 71 may, for example, include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 71A comprising computer instructions is stored in the memory 72 and executed by the processing system 71 to perform any of the methods, operations, functions or steps described in the foregoing. As indicated in FIG. 7, the memory 72 may also store control data 72B for use by the processing system 72, for example the transformation matrices, the penalization factor, the penalized transformation matrices, etc. The control program 72A may be supplied to the computer resource 70 on a computer-readable medium 75, which may be a tangible (non-transitory) product (e.g. magnetic medium, optical disk, read-only memory, flash memory, etc.) or a propagating signal.

The foregoing description is applicable irrespective of the number of objects and scene points. Although the object is represented as a human individual in FIG. 1, the disclosed technique is applicable to any type of object, be it living or inanimate, moving or stationary.

The technique disclosed and described herein has a variety of applications such as 3D vision inspection, product assembly, goods inspection, human-computer interaction, video surveillance, sports broadcasting, industry robot control, navigation, etc. In one generic application, calculated 3D positions of scene points are used in estimating and tracking the 3D pose of the one or more objects in the scene. The present Applicant contemplates to arrange a monitoring system that implements the disclosed technique to track individuals in an exercise situation, for example in a gym. For example, the monitoring system may track how the individuals move around the gym, identify activity and count repetitions by use of the tracked 3D positions of the individuals, for example representing joints of the individuals, and store corresponding exercise data for the respective individual in a database for access by the respective individual or another party.

In the following, a set of items are recited to summarize some aspects and embodiments of the invention as disclosed in the foregoing.

Item 1: A method of determining a location of a scene point (12) in a global coordinate system (10'), said method comprising: obtaining (501) location data for image points (22) that represent the scene point (12) in a plurality of overlapping views, the location data comprising location coordinates of a respective image point in a local coordinate system (10) of a respective view, the local coordinate system (10) comprising a distance coordinate axis (z) that is perpendicular to a predefined image plane (21) of the respective view; obtaining (502) a transformation matrix (P1, . . . , Pn) of the respective view, the transformation matrix (P1, . . . , Pn) defining a transformation operation between the local coordinate system (10) of the respective view and the global coordinate system (10'); and determining (503) the location of the scene point (12) in the global coordinate system (10); wherein said determining (503) comprises minimizing (503B) a plurality of differences between first and second estimated locations (E1, E2) of the scene point (12) in the local coordinate system (10) of the respective view, wherein the first estimated location (E1) is given by a linear scaling of the location coordinates of the respective image point in the respective view, and the second estimated location (E2) is given by operating the transformation matrix (P1, . . . , Pn) of the respective view on the location of the scene point (12) in the global coordinate system (10'); and wherein the plurality of differences is defined (503A) to penalize differences that comprise the linear scaling as applied along the distance coordinate axis (z).

Item 2: The method of item 1, wherein said minimizing (503A, 503B) is performed as a function of: the location of the scene point (12) in the global coordinate system (10') and scaling factors, which are associated with the plurality of overlapping views and applied in the linear scaling.

Item 3: The method of item 1 or 2, wherein said minimizing (503A, 503B) comprises populating (513), as a function of the location data and the transformation matrix of the respective view, a first matrix M of a matrix product M·v that represents the plurality of differences, and determining (514) a solution vector v that minimizes the matrix product M·v, the solution vector v representing the location of the scene point (12) in the global coordinate system (10') and the scaling factors, wherein a penalization factor is applied to selected matrix elements of the first matrix M, the selected matrix elements defining differences that comprise the linear scaling as applied along the distance coordinate axis (z).

Item 4: The method of item 3, wherein the first matrix is given by:

$$M = \begin{bmatrix} P1' & -s1 & 0 & \ldots & 0 \\ P2' & 0 & -s2 & \ldots & 0 \\ \vdots & \vdots & \vdots & \ldots & 0 \\ \vdots & \vdots & \vdots & \ldots & 0 \\ pn' & 0 & 0 & \ldots & -sn \end{bmatrix},$$

with P1', . . . , Pn' being a penalized transformation matrix of the respective view, and s1, . . . , sn being a location vector comprising the location coordinates of the respective image point in the local coordinate system (10) of the respective view, wherein the penalized transformation matrix P1', ..., Pn' of the respective view is obtained by scaling matrix elements in one row of the transformation matrix P1, ..., Pn of the respective view by the penalization factor, and wherein a local coordinate corresponding to said one row in each location vector s1, ..., sn is scaled by the penalization factor.

Item 5: The method of item 4, wherein the penalization factor is predefined and at least $10^2$, $10^3$, $10^4$, $10^5$, $10^6$, $10^7$, $10^8$, $10^9$ or $10^{10}$.

Item 6: The method of item 4 or 5, wherein the penalized transformation matrix P1', ..., Pn' is a 3×4 matrix, and the location vector s1, ..., sn is a 3×1 vector.

Item 7: The method of any one of items 4-6, wherein the location vector of view i is given by:

$$si = \begin{bmatrix} o_{ix} \\ o_{iy} \\ \lambda \end{bmatrix},$$

with $o_{ix}$, $o_{iy}$ being the local coordinates of the respective image point within the predefined image plane (21), and wherein the penalized transformation matrix of view i is given by:

$$Pi' = \begin{bmatrix} Pi(1,1) & Pi(1,2) & Pi(1,3) & Pi(1,4) \\ Pi(2,1) & Pi(2,2) & Pi(2,3) & Pi(2,4) \\ \lambda \cdot Pi(3,1) & \lambda \cdot Pi(3,2) & \lambda \cdot Pi(3,3) & \lambda \cdot Pi(3,4) \end{bmatrix},$$

with Pi(k, l) being elements of the transformation matrix Pi, and $\lambda$ being the penalization factor.

Item 8: The method of any one of items 3-7, wherein the solution vector is given by:

$$v = \begin{bmatrix} S \\ q1 \\ \vdots \\ qn \end{bmatrix},$$

with S being a global location vector identifying the location of the scene point (12) in the global coordinate system (10'), and q1, ..., qn being the scaling factors.

Item 9: The method of item 8, wherein the location vector S is a 4×1 vector comprising homogeneous coordinates.

Item 10. A device for determining a location of a scene point (12) in a global coordinate system (10'), said device comprising an input (73) configured to receive location data for image points (22) that represent the scene point (12) in a plurality of overlapping views, and a processing system (71) configured to perform the method in accordance with any one of items 1-9.

Item 11: A monitoring system, comprising: a plurality of imaging devices (2) for distributed arrangement in relation to a scene and configured to produce image data representing a plurality of overlapping views of the scene; a processing device (3) configured to receive and process the image data to generate location data for image points (22) that represent a scene point (12) in the plurality of overlapping views; and the device in accordance with item 10.

Item 12: A computer-readable medium comprising computer instructions (72A) which, when executed by a processing system (71), cause the processing system (71) to perform the method of any one of items 1-9.

What is claimed is:

1. A method of determining a location of a scene point in a global coordinate system, said method comprising:
    obtaining location data for image points that represent the scene point in a plurality of overlapping views, the location data comprising location coordinates of a respective image point in a local coordinate system of a respective view, the local coordinate system comprising a distance coordinate axis that is perpendicular to a predefined image plane of the respective view;
    obtaining a transformation matrix of the respective view, the transformation matrix defining a transformation operation between the local coordinate system of the respective view and the global coordinate system; and
    determining the location of the scene point in the global coordinate system;
    wherein said determining comprises minimizing a plurality of differences between first and second estimated locations of the scene point in the local coordinate system of the respective view, wherein the first estimated location is given by a linear scaling of the location coordinates of the respective image point in the respective view, and the second estimated location is given by operating the transformation matrix of the respective view on the location of the scene point in the global coordinate system; and
    wherein minimizing the plurality of differences is done by penalizing differences resulting from linear scaling applied along the distance coordinate axis of the local coordinate system.

2. The method of claim 1, wherein said minimizing is performed as a function of: the location of the scene point in the global coordinate system and scaling factors, which are associated with the plurality of overlapping views and applied in the linear scaling.

3. The method of claim 1, wherein said minimizing comprises populating, as a function of the location data and the transformation matrix of the respective view, a first matrix M of a matrix product M·v that represents the plurality of differences, and determining a solution vector v that minimizes the matrix product M·v, the solution vector v representing the location of the scene point in the global coordinate system and scaling factors, wherein a penalization factor is applied to selected matrix elements of the first matrix M, the selected matrix elements defining differences resulting from the linear scaling applied along the distance coordinate axis.

4. The method of claim 3, wherein the first matrix is given by:

$$M = \begin{bmatrix} P1' & -s1 & 0 & \cdots & 0 \\ P2' & 0 & -s2 & \cdots & 0 \\ \vdots & \vdots & \vdots & \cdots & 0 \\ \vdots & \vdots & \vdots & \cdots & 0 \\ pn' & 0 & 0 & \cdots & -sn \end{bmatrix},$$

with P1', ..., Pn' being a penalized transformation matrix of the respective view, and s1, ..., sn being a location vector comprising the location coordinates of the respective image point in the local coordinate system of the respective view, wherein the penalized transformation matrix P1', ..., Pn' of the respective view is obtained by scaling matrix elements in one row of the transformation matrix P1, ..., Pn of the respective view by the penalization factor, and wherein a local coordinate corresponding to said one row in each location vector s1, . . . , sn is scaled by the penalization factor.

5. The method of claim 4, wherein the penalization factor is predefined and at least $10^2$, $10^3$, $10^4$, $10^5$, $10^6$, $10^7$, $10^8$, $10^9$ or $10^{10}$.

6. The method of claim 4, wherein the penalized transformation matrix P1', . . . , Pn' is a 3×4 matrix, and the location vector s1, . . . , sn is a 3×1 vector.

7. The method of claim 4, wherein the location vector of view i is given by:

$$si = \begin{bmatrix} o_{ix} \\ o_{iy} \\ \lambda \end{bmatrix},$$

with $o_{ix}$, $o_{iy}$ being the local coordinates of the respective image point within the predefined image plane, and wherein the penalized transformation matrix of view i is given by:

$$Pi' = \begin{bmatrix} Pi(1,1) & Pi(1,2) & Pi(1,3) & Pi(1,4) \\ Pi(2,1) & Pi(2,2) & Pi(2,3) & Pi(2,4) \\ \lambda \cdot Pi(3,1) & \lambda \cdot Pi(3,2) & \lambda \cdot Pi(3,3) & \lambda \cdot Pi(3,4) \end{bmatrix},$$

with Pi(k, l) being elements of transformation matrix Pi, and $\lambda$ being the penalization factor.

8. The method of claim 3, wherein the solution vector is given by:

$$v = \begin{bmatrix} S \\ q1 \\ \vdots \\ qn \end{bmatrix},$$

with S being a global location vector identifying the location of the scene point in the global coordinate system, and q1, . . . , qn being the scaling factors.

9. The method of claim 8, wherein the global location vector S is a 4×1 vector comprising homogeneous coordinates.

10. A device for determining a location of a scene point in a global coordinate system, said device comprising:
an input configured to receive location data for image points that represent the scene point in a plurality of overlapping views; and
a processing system configured to:
obtain the location data from the input, the location data comprising location coordinates of a respective image point in a local coordinate system of a respective view, the local coordinate system comprising a distance coordinate axis that is perpendicular to a predefined image plane of the respective view;
obtain a transformation matrix of the respective view, the transformation matrix defining a transformation operation between the local coordinate system of the respective view and the global coordinate system; and
determine the location of the scene point in the global coordinate system,
wherein the location is determined by minimizing a plurality of differences between first and second estimated locations of the scene point in the local coordinate system of the respective view, wherein the first estimated location is given by a linear scaling of the location coordinates of the respective image point in the respective view, and the second estimated location is given by operating the transformation matrix of the respective view on the location of the scene point in the global coordinate system, and
wherein minimizing the plurality of differences is done by penalizing differences resulting from linear scaling applied along the distance coordinate axis of the local coordinate system.

11. The device of claim 10, wherein said processing system is configured to perform said minimizing as a function of: the location of the scene point in the global coordinate system and scaling factors, which are associated with the plurality of overlapping views and applied in the linear scaling.

12. The device of claim 10, wherein said processing system is configured to perform said minimizing by populating, as a function of the location data and the transformation matrix of the respective view, a first matrix M of a matrix product M·v that represents the plurality of differences, and determining a solution vector v that minimizes the matrix product M·v, the solution vector v representing the location of the scene point in the global coordinate system and scaling factors, wherein a penalization factor is applied to selected matrix elements of the first matrix M, the selected matrix elements defining differences resulting from the linear scaling applied along the distance coordinate axis.

13. The device of claim 12, wherein the first matrix is given by:

$$M = \begin{bmatrix} P1' & -s1 & 0 & \ldots & 0 \\ P2' & 0 & -s2 & \ldots & 0 \\ \vdots & \vdots & \vdots & \ldots & 0 \\ \vdots & \vdots & \vdots & \ldots & 0 \\ pn' & 0 & 0 & \ldots & -sn \end{bmatrix},$$

with P1', . . . , Pn' being a penalized transformation matrix of the respective view, and s1, . . . , sn being a location vector comprising the location coordinates of the respective image point in the local coordinate system of the respective view, wherein the penalized transformation matrix P1', . . . , Pn' of the respective view is obtained by scaling matrix elements in one row of the transformation matrix P1, . . . , Pn of the respective view by the penalization factor, and wherein a local coordinate corresponding to said one row in each location vector s1, . . . , sn is scaled by the penalization factor.

14. The device of claim 13, wherein the penalization factor is predefined and at least $10^2$, $10^3$, $10^4$, $10^5$, $10^6$, $10^7$, $10^8$, $10^9$ or $10^{10}$.

15. The device of claim 13, wherein the penalized transformation matrix P1', . . . , Pn' is a 3×4 matrix, and the location vector s1, . . . , sn is a 3×1 vector.

16. The device of claim 13, wherein the location vector of view i is given by:

$$si = \begin{bmatrix} o_{ix} \\ o_{iy} \\ \lambda \end{bmatrix},$$

with $o_{i,x}$, $o_{i,y}$ being the local coordinates of the respective image point within the predefined image plane, and wherein the penalized transformation matrix of view i is given by:

$$Pi' = \begin{bmatrix} Pi(1,1) & Pi(1,2) & Pi(1,3) & Pi(1,4) \\ Pi(2,1) & Pi(2,2) & Pi(2,3) & Pi(2,4) \\ \lambda \cdot Pi(3,1) & \lambda \cdot Pi(3,2) & \lambda \cdot Pi(3,3) & \lambda \cdot Pi(3,4) \end{bmatrix},$$

with Pi(k, l) being elements of transformation matrix Pi, and λ being the penalization factor.

17. The device of claim 12, wherein the solution vector is given by:

$$v = \begin{bmatrix} S \\ q1 \\ \vdots \\ qn \end{bmatrix},$$

with S being a global location vector identifying the location of the scene point in the global coordinate system, and q1, . . . , qn being the scaling factors.

18. The device of claim 17, wherein the global location vector S is a 4×1 vector comprising homogeneous coordinates.

19. A monitoring system, comprising:
a plurality of imaging devices for distributed arrangement in relation to a scene and configured to produce image data representing a plurality of overlapping views of the scene;
a processing device configured to receive and process the image data to generate location data for image points that represent a scene point in the plurality of overlapping views; and
a device for determining a location of the scene point in a global coordinate system, the device comprising:
an input configured to receive location data for image points that represent the scene point in the plurality of overlapping views; and
a processing system configured to:
obtain the location data from the input, the location data comprising location coordinates of a respective image point in a local coordinate system of a respective view, the local coordinate system comprising a distance coordinate axis that is perpendicular to a predefined image plane of the respective view;
obtain a transformation matrix of the respective view, the transformation matrix defining a transformation operation between the local coordinate system of the respective view and the global coordinate system; and
determine the location of the scene point in the global coordinate system,
wherein the location is determined by minimizing a plurality of differences between first and second estimated locations of the scene point in the local coordinate system of the respective view, wherein the first estimated location is given by a linear scaling of the location coordinates of the respective image point in the respective view, and the second estimated location is given by operating the transformation matrix of the respective view on the location of the scene point in the global coordinate system, and
wherein minimizing the plurality of differences is done by penalizing differences resulting from linear scaling applied along the distance coordinate axis of the local coordinate system.

* * * * *